Dec. 18, 1962  J. A. BROWN  3,069,153
WELDING JIG
Filed May 5, 1959

United States Patent Office 3,069,153
Patented Dec. 18, 1962

3,069,153
WELDING JIG
Joseph A. Brown, Baton Rouge, La., assignor to Ethyl Corporation, New York, N.Y., a corporation of Delaware
Filed May 5, 1959, Ser. No. 811,081
3 Claims. (Cl. 269—58)

The present invention relates to a welding jig, and more specifically to such a device employed in the welding and reaming of electrolytic cell sub-assemblies which have a plurality of cylindrical openings.

The production of metallic sodium by electrolysis has been known for many years. The electrolysis is conducted, predominantly, in a cell which is basically similar to that devised by Downs and described in U.S. Patent 1,501,756. Characteristically, a mixture of sodium chloride and calcium chloride salts are employed as the fused "bath." Because of the high operating temperatures and because of the nature of the products formed, particularly the chlorine gas liberated within the cell during electrolysis, the corrosion problem is rather acute. Consequently, it is essential to periodically replace such parts of the electrolytic cell as the collector, the cell base, etc., when the cylindrical openings within the subassemblies no longer conform to certain prescribed tolerances. Rather than discard these rather expensive sub-assemblies it is customary within the industry to rebuild them so that they again conform to prescribed specifications. To do this a thickness of metal is deposited over the entire inner surfaces of the cylindrical openings of a sub-assembly by welding. The openings are then reworked, i.e., the excess metal within the openings is cut away with a reaming tool, until they conform to the desired tolerances. The sub-assemblies thus reworked can be replaced in the cell.

In present plant practice it is customary to insert an electrolytic cell sub-assembly, for example a collector, into a jig in such position that the cylindrical opening to be worked upon is located at what will be the center of revolution of the jig. The inner surfaces of the cylindrical openings are then welded by revolving the jig about the operative portion of a welding tool which deposits a layer of metal around the circumference of the opening. The welding tool is axially moveable within the said opening, but because of its inflexible nature cannot be revolved. The excess metal is then removed from an opening as by reaming. When work has been completed on the cylindrical opening in question, the entire sub-assembly must be removed from the jig, the sub-assembly rotated, reinserted into the jig so that the next cylindrical opening is aligned with the welding tool. When it is considered that the weight of an electrolytic cell sub-assembly may vary from several hundred up to a few thousand pounds, it is obvious that this removal and reinsertion step for each cylindrical opening is no simple task.

Figure 2:
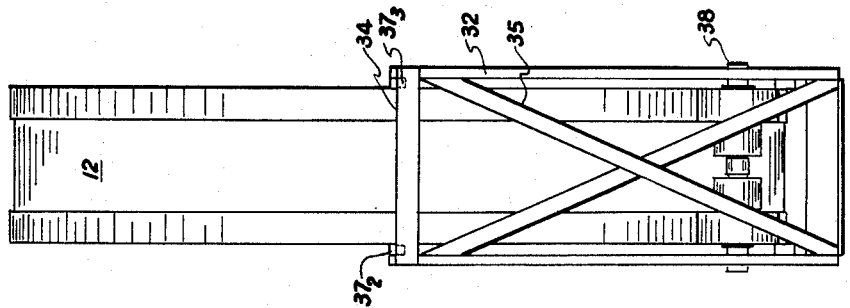
Figure 1:
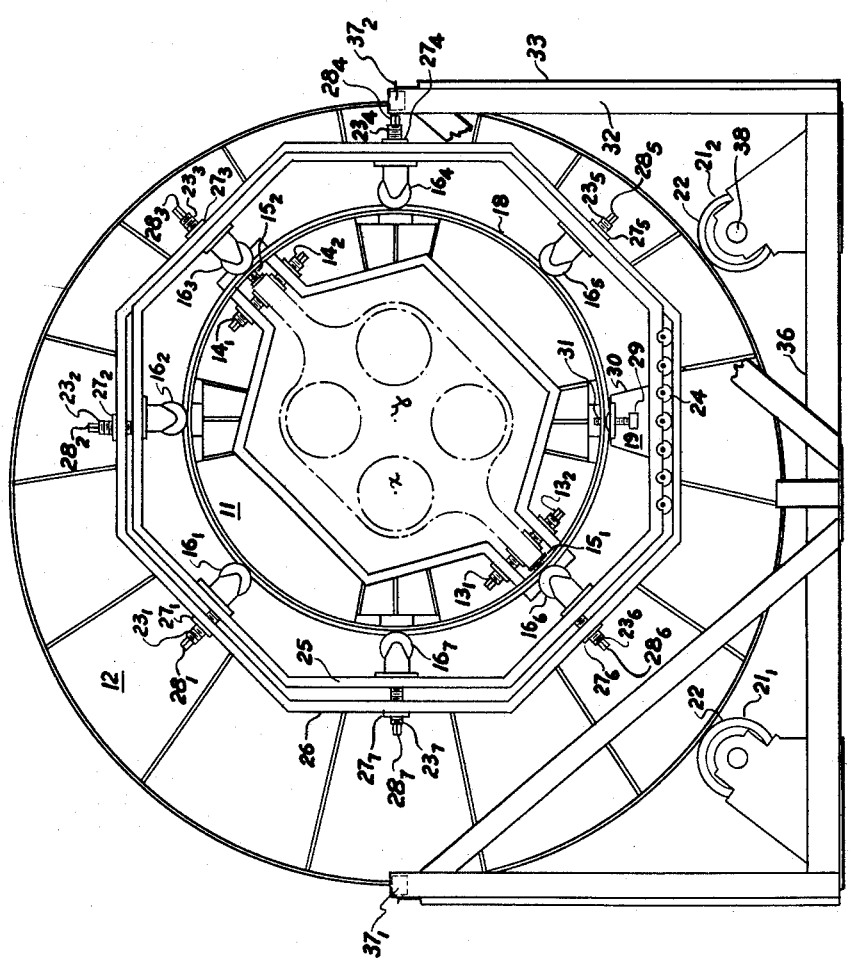

It is accordingly an object of the present invention to provide a jig for use with a welding or reaming tool, or similar device not of a highly flexible nature, by means of which the cylindrical ports of a workpiece can be serially indexed to conform with the lateral and vertical locationing of the operative portion of said tool. More specifically it is an object of the present invention to provide a welding jig for use with such a tool. Even more specifically it is an object to provide a cathode welding jig for use with a welding and reaming tool, or similar inflexible device. These and other objects will become apparent by reference to the attached figures in which, FIGURE 1 is a front elevation view of such a welding jig showing a workpiece (in this case, a cathode assembly) fastened within an inner member which is rotatable within an outer member such that a cylindrical port opening of the workpiece can be serially indexed on the axis of rotation X of the outer member, and FIGURE 2 is a side elevation of the welding jig which illustrates this embodiment of the invention in better perspective.

Broadly, the present invention provides an apparatus for positioning an electrolytic cell sub-assembly for welding, reaming, or the like, said sub-assembly having a plurality of cylindrical openings the centers of which fall generally upon a common circle, comprising two eccentric rotatable members, the first member having a cavity or opening for receiving such cell assembly, and being independently rotatable about its own axis. The second member is rotatable about a second axis which passes through the area defined by the cavity within the said first member and also lies substantially on the circle defined by the loci of the centers of the electrolytic cell sub-assembly cylindrical openings. By means of this apparatus the cylindrical openings of the sub-assembly can be serially indexed with the axis of the second member and the inner walls of the said openings operated upon by a welding or reaming tool while the members are rotated about the said second axis.

A preferred embodiment of the present invention is an apparatus generally of the type described above wherein the two eccentric members are rotatable within a common plane and the said second member is rotatable about an axis which corresponds to the center of rotation of the said member. An even more preferred embodiment of the present invention is one wherein the two eccentric members are of circular design and one of the members is located within the other member, the inner member being the jig component which transports the cylindrical openings of the workpiece into alignment within the operating tool which is located at the axis of rotation or geometric center of the outer member.

The novel features which are considered as characteristics of the invention are set forth in particularity in the appended claims. The invention itself however, both as to its construction and method of operation, together with additional objects and advantages thereof, will be best understood from the following description of a specific embodiment.

Referring to FIGURE 1, there is shown a front elevation view of jig assembly having a workpiece, i.e., a cathode assembly shown in dotted lines, affixed therein. The jig assembly is comprised of two eccentric circular members, one member 11, hereinafter referred to as a first member or inner member, being located within an outer member 12 and each rotatable within a common plane. The inner member 11 has a generally centrally located cavity for receiving a workpiece or cell sub-assembly. The said workpiece is rigidly fastened therein by means of the sets of axially adjustable clamp screws or clamps $13_1$, $13_2$, $14_1$, $14_2$ the terminuses of which abut the workpiece. The terminus of the electrodes of the cathode assembly is also buttressed by the members $15_1$, $15_2$. The shape of the cavity and number of clamps employed for this purpose is not of the essence. The inner member 11 is supported within the outer member 12 by means of the rails 18 affixed to the inner member 11, which are supported upon a plurality of adjustable rollers $16_1$–$16_7$ affixed to the outer member 12. These provide rolling contact for the independent rotational motion of the said inner member 11 within the outer member 12 and about an axis Y located at its center. These rollers 16 also provide another function, i.e., lateral shifting of the inner member 11, the manner and purpose of which will be described in the following paragraph.

The adjustable rollers 16 are affixed to the said outer member 12 by means of threaded shanks or bolts 23₁–23₇ which extend through a movable cage 25 and through a lip portion 26 which is an integral part of the outer member 12. It is affixed thereto by means of retaining rings 27₁–27₇, through which the shanks 23 are axially movable. The ends of the shanks 23 are usually provided with hexagonal shaped heads 28₁–28₇ upon which a ratchet can be fitted and the shanks 23 turned and the rollers 16 moved axially inward or outward. The inner member 11 is laterally shiftable so that the distance between its axis Y and the axis X of the second member located at the geometric center of the outer member can be lengthened or shortened. By this means a workpiece or a cell sub-assembly can be inserted within the inner member 11 and its cylindrical openings sequentially aligned with the geometric center of the outer member 12 regardless of the uniformity of distance of the cylindrical openings from the center or axis Y of the inner member 11. This also permits the insertion of sub-assemblies wherein the loci of the cylindrical opening centers define circles of various radii. The lateral shifting of the inner member 11 is readily accomplished by rotation of the adjustable roller shanks or bolts 23 which cause the rollers 16 to be thrust inward or outward along their axis. The movable cage 25 can thus be horizontally moved in the direction of the unbalanced force exerted by the thrust produced by adjustment of the rollers 16. The roller bearings 24 preserve the vertical orientation of the movable cage 25 and consequently of the inner member 11, and eliminate most of the friction, and permit the said cage 25 to roll horizontally in the direction of the unbalanced thrust.

Within the outer member 12 there is also provided a locking means 19 for preventing rotation of the said inner member 11 and its axis Y during rotation of the outer member 12. This is described in the following paragraph.

The locking means 19 consists of a large cap screw or bolt 29 mounted within a frame or bracket 30 affixed upon the movable cage 25. The bolt 29 is axially movable within the bracket 30 so that it can be moved toward or away from the inner member 11. When it is moved against the inner member 11, or into recesses 31 located within the outer wall of the said member 11, the rotation of said member is prevented. Thus, there is provided means for preserving the position of a cylindrical opening at the center of rotation while the said members are being revolved.

The outer member 12 of the welding jig is in contact with and supported upon the tangential rollers 21₁, 21₂ which provide for the rotational motion of the said member about the axis X which corresponds to the geometric center of the said member. Referring to FIGURE 2 there is shown a side view of the jig within its enclosing cage 32 which consists of the vertical members 33, horizontal members 34, diagonal members 35 and the base 36. The enclosing cage 32 is merely to prevent the possibility of the jig jumping off the tangential rollers 21 whereupon it is held only by its own weight. Shim rollers 37₁, 37₂, 37₃ are generally provided to add an inward thrust to help prevent this possibility. The axle 38 of the tangential roller is operatively connected with motor means for driving the jig, as hereinafter described.

The entire jig assembly can be rotated by hand but preferably motor means are provided therefor. Such motor means can be driven by any prime mover, steam, electrical, pneumatic, etc. Preferably there is provided motor means which are operatively connected to one, or more, of the tangential rollers 21 by rotation of which the entire jig can be turned. Generally, the roller 21 to which the driving mechanism is operatively connected is equipped with a flat tread rubber tire 22 which creates greater friction and thereby reduces slippage.

By means of the above described jig a workpiece such as a cathode assembly, a cell base, or other cell sub-assembly having a plurality of cylindrical openings can be sequentially indexed with the axis X or geometric center of the outer member and welded, reamed, or worked in similar manner. The device is not intended to be limited to the details shown, since various modifications and structural changes can be made without departing from the spirit and scope of the present invention.

What is claimed is:

1. An apparatus for positioning an electrolytic cell sub-assembly for welding, reaming, or the like, said sub-assembly having a plurality of cylindrical openings the centers of which fall generally upon a common circle comprising two members which are mounted eccentrically one with the other and being rotatable within a common plane, the first member having a cavity for receiving a sub-assembly and being independently rotatable within a second member and about a first axis, and the second member being rotatable about a second axis which corresponds to the geometric center of said second member, means for rotating the second member about the second axis, said second axis passing through the area defined by the cavity within the first member and also lying substantially on the circle defined by the loci of the centers of the electrolytic cell sub-assembly cylindrical openings whereby the said sub-assembly cylindrical openings can be indexed in seriatim with and can be rotated about the geometric center of the outer member.

2. An apparatus for positioning an electrolytic cell sub-assembly for welding, reaming, or the like, said sub-assembly having a plurality of cylindrical openings the centers of which fall generally upon a common circle, comprising two circular members which are mounted eccentrically one with the other, the first member located within a second member and each rotatable within a common plane, rollers supporting the said first member within the second member, said rollers being affixed to the second member to provide rolling contact thereupon for the first member which is independently rotatable within the second member and about a first axis, said first member having a generally central cavity for receiving a sub-assembly and clamping means for fastening the said sub-assembly within the cavity, and the second member being rotatable about a second axis at the geometric center of said second member, said second axis passing through the area defined by the cavity within the first member and also lying on the circle defined generally by the loci of the centers of the electrolytic cell sub-assembly cylindrical openings, said second member having means for locking the first member so that it cannot rotate about the first axis, whereby the said sub-assembly cylindrical openings can be indexed in seriatim with and can be rotated about the geometric center of the outer member.

3. An apparatus for positioning an electrolytic cell sub-assembly for welding, reaming, and the like, said sub-assembly having a plurality of cylindrical openings comprising two circular members which are mounted eccentrically one with the other, one member being located within the other member and each rotatable within a common plane, the inner member having a generally central cavity for receiving a sub-assembly and clamping means for fastening the said sub-assembly within the cavity in fixed relation with the said member, adjustable rollers affixed to the outer member for support of the said inner member within the outer member and to provide rolling contact for independent rotational motion of the inner member within the outer member and about a first axis, means on the outer member for locking the inner member in fixed relation to the outer member so that the inner member cannot rotate about said first axis, a plurality of tangential rollers in friction contact with the outer member so that the said outer member is rotatable about a second axis located at the geometric center of said outer member, at least one of said tangential rollers adapted to be operatively connected to driving means for driving the said tangential roller, a movable cage adjustably affixed within the confines of the outer member and encompassing the inner member, adjustable rollers supporting said cage, said adjustable rollers being affixed to the outer member and providing rolling contact with the movable cage so that the said inner member can be laterally transported and its axis of rotation laterally shiftable in relation to the outer member so that the distance between the axes of the outer and inner members are adjustable to correspond with the radius of the circle defined by the loci of the centers of the electrolytic cell sub-assembly cylindrical openings whereby the cylindrical openings of electrolytic cell sub-assemblies of variable distance from a center can be indexed in seriatim with and can be rotated about the axis of the outer member.

References Cited in the file of this patent

UNITED STATES PATENTS

| | | |
|---|---|---|
| 1,574,631 | Misfield | Feb. 23, 1926 |
| 2,232,431 | Bilocq | Feb. 18, 1941 |
| 2,793,041 | Barbier et al. | May 21, 1957 |
| 2,953,069 | Smith | Sept. 20, 1960 |